July 10, 1934.  J. LEVOY  1,965,707
EXPANSIBLE WHEEL
Filed Feb. 12, 1932
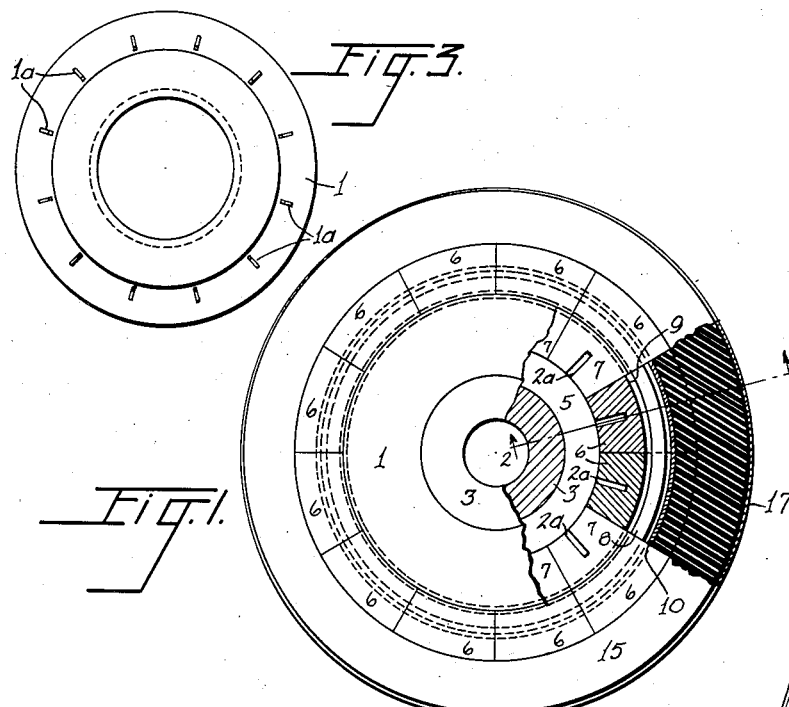
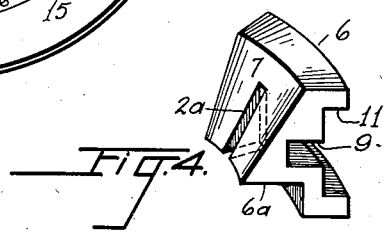
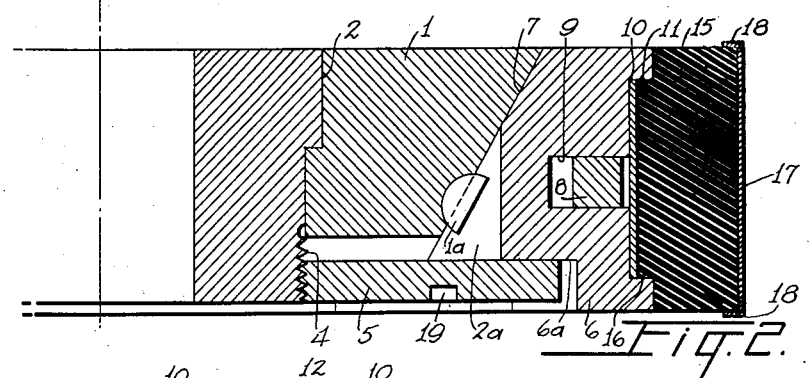
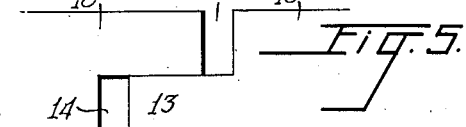
INVENTOR.
JOSEPH LEVOY
BY
ATTORNEYS.

Patented July 10, 1934

1,965,707

UNITED STATES PATENT OFFICE 1,965,707

EXPANSIBLE WHEEL

Joseph Levoy, Berkeley, Calif., assignor of one-half to Armin H. Green, San Francisco, Calif.

Application February 12, 1932, Serial No. 592,608

5 Claims. (Cl. 51—190)

The present invention relates to improvements in expansible wheels, and more particularly has reference to polishing or buffing wheels in which an endless band of sand paper or the like is used on a periphery of an expansible wheel for polishing purposes.

The principal object of the invention is to provide an expansible wheel of the character described that is self-contained, easy to manipulate, economic in structure, and in which the endless band is firmly held to its seat and is supported so as to render its entire surface active at all times.

A further object of the invention is to provide an expansible wheel of the character described in which all the parts are firmly held against the effects of centrifugal force, and in which all possibility of parts loosening themselves is eliminated.

A further object of the invention is to provide an expansible wheel of the character described which may be easily fitted to many different uses and readily applied to journals or shafts of different character.

Further objects and advantages of my invention will appear as the specification proceeds.

The preferred form of my invention is illustrated in the accompanying drawing in which Figure 1 shows a plan view of my expansible wheel, certain portions being shown in section;

Figure 2 an enlarged radial section taken along line 2—2 of Figure 1;

Figure 3 a detail view of a frusto-conical body used in my expansible wheels;

Figure 4 a perspective view of a sector used in my device; and

Figure 5 a fragmentary detail view of a bridging member used in my invention.

While I have shown only the preferred form of the invention, I wish to have it understood that various changes or modifications may be made within the scope of the claims hereto attached without departing from the spirit of the invention.

In its preferred form my invention comprises a frusto-conical body 1 illustrated in detail in Figure 3, fastened as shown at 2 upon a bushing 3, which latter projects beyond the small end of the frusto-conical body and is threaded as shown at 4 to receive the nut 5.

As a second part my invention comprises a plurality of sectors 6 shaped so as to present, when arranged in peripheral relation, a conical inner face 7 substantially fitting the outer face of the body 1 and adapted to slide thereon in axial direction. One end of each sector is recessed so that the entire sector ring forms a ledge 6—a against which the nut 5 seats. The thickness of the sector ring slightly exceeds that of the frusto-conical body 1 so that the nut 5 may be screwed home without contacting the frusto-conical body 1. The sectors are held in assembled relation by a ring 8 lying in registering grooves 9 of the sectors, the grooves extending into the sectors from their outer peripheral faces.

For insuring even expansion in all directions of the sector ring I provide guides 1—a fixed to the frusto-conical body in radial planes, and registering slots 2—a in the sectors whereby the latter are constrained to move in the same radial plane and to remain evenly spaced.

Encircling the sectors 6 I provide a bridging ring or member 10 which is accommodated in a second groove 11 in the outer face of the sectors in such a manner as to overlie the smaller grooves 9. Since this bridging member has to be sprung in place it must be made of material that is slightly springy and must be split as shown at 12 in Figure 5, with preferably a tongue 13 extending into a corresponding recess 14.

Overlying this bridging member I provide a heavy band 15 of rubber, the band being formed with an inner projection 16 fitting in the groove 11 outside the bridging member 10. An endless band 17 of abrasive material is placed around the rubber to form a wear surface.

The band 17 may be molded as a flat band or it may be molded with flanges 18 projecting over the end faces of the rubber so as to protect the latter and to allow of simultaneous polishing of two faces arranged at right angles to one another. As a matter of fact the rubber band may be made of any suitable cross-section as for instance semi-circular or tapered, and the abrasive band may be shaped accordingly.

To assemble my expansible wheel I first arrange the sectors 6 on the ring 8 in loosely assembled relation. I then insert the conical body 1 into the sector ring in such a manner that the threaded end of the bushing 4 projects through the narrow end of the sector ring and is adapted to receive the nut 5, which is now loosely threaded on the threaded projection 4 to hold the different parts in assembled relation. Next the bridging ring 10 is sprung into the groove 11, whereupon the rubber ring is forced over the member 10. After the rubber ring has been positioned, the last band of abrasive material is slipped over the rubber. Now the nut 5 is turned by means of a suitable wrench engaging with the recesses 19 until it contacts the ledge 6—a. It will be noted that in expanding the sector ring, each sector is guided radially by the guide 1—a so that in expanded position the sectors are evenly spaced and the entire wheel is evenly balanced for smooth operation.

I claim:

1. A wheel comprising a frusto-conical body having a threaded axial projection, a plurality of ring-sectors shaped for seating against the body in encircling relation, means for holding the ring sectors peripherally aligned and for limiting their outward movement, and a nut threaded on the projection for expanding the sectors, the sectors having inner recesses adapted to accommodate the nut within the end planes of the wheel.

2. A wheel comprising a plurality of ring sectors shaped to form a ring with a frusto-conical inner face when assembled and having registering peripheral grooves therein, a second ring of non-yielding material fitting in the grooves for holding the sectors in assembled relation, and a frusto-conical body fitting against the inner face of the sector-ring and having a nut bearing on the opposite side of the sector ring for axially moving the same relative to the sector-ring for expanding the latter.

3. A wheel comprising a plurality of ring sectors adapted for coaction in forming a complete ring, a metallic bridging member encircling the sectors so as to bridge the spacing between the sectors, a rubber ring encircling the bridging member and means for expanding the sector ring against the bridging member and the rubber ring.

4. A wheel comprising a plurality of ring sectors adapted for coaction in forming a complete ring and having registering peripheral grooves therein, a second ring of non-yielding material disposed in the grooves for holding the sectors in assembled relation and means for expanding the sector ring.

5. A wheel comprising a plurality of ring sectors adapted for co-action in forming a complete ring and having registering peripheral grooves therein, a second ring of non-yielding material disposed in the grooves for holding the sectors in assembled relation, an elastic ring surrounding the sector ring and means for expanding the sector ring toward the elastic ring.

JOSEPH LEVOY.